US009178910B2

(12) United States Patent
Yamagata et al.

(10) Patent No.: US 9,178,910 B2
(45) Date of Patent: Nov. 3, 2015

(54) COMMUNICATION SYSTEM, CONTROL APPARATUS, POLICY MANAGEMENT APPARATUS, COMMUNICATION METHOD, AND PROGRAM

(75) Inventors: Masaya Yamagata, Tokyo (JP); Masayuki Nakae, Tokyo (JP); Yoichiro Morita, Tokyo (JP); Hideyuki Shimonishi, Tokyo (JP); Kentaro Sonoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 67 days.

(21) Appl. No.: 13/991,588

(22) PCT Filed: Dec. 22, 2011

(86) PCT No.: PCT/JP2011/079938
§ 371 (c)(1),
(2), (4) Date: Jun. 4, 2013

(87) PCT Pub. No.: WO2012/086816
PCT Pub. Date: Jun. 28, 2012

(65) Prior Publication Data
US 2013/0263214 A1 Oct. 3, 2013

(30) Foreign Application Priority Data
Dec. 24, 2010 (JP) .................................. 2010-287908

(51) Int. Cl.
*G06F 7/04* (2006.01)
*H04L 29/06* (2006.01)
(Continued)

(52) U.S. Cl.
CPC ............ *H04L 63/20* (2013.01); *H04L 41/0893* (2013.01); *H04L 47/808* (2013.01); *H04W 12/08* (2013.01); *H04L 63/10* (2013.01)

(58) Field of Classification Search
CPC ... H04L 41/0893; H04L 47/808; H04L 63/10; H04L 63/20; H04W 12/08

USPC .......................................................... 726/1–2
See application file for complete search history.

(56) References Cited

U.S. PATENT DOCUMENTS 7,530,112 B2 * 5/2009 Smith ............................ 726/28
8,094,674 B2 * 1/2012 Zhou et al. .................... 370/462
(Continued)

FOREIGN PATENT DOCUMENTS

| JP | 2004-318582 A | 11/2004 |
| JP | 2009-135805 A | 6/2009 |
| WO | 2008/095010 A1 | 8/2008 |

OTHER PUBLICATIONS

"OpenFlow Switch Specification", Version 1.0.0 (Wire Protocol 0x01), 2009, Internet, <http://www.openflowswitch.org/documents/openflow-spec-v1.0.0.pdf>.

(Continued)

*Primary Examiner* — Samson Lemma
(74) *Attorney, Agent, or Firm* — Sughrue Mion, PLLC

(57) ABSTRACT

The present invention implements detailed access control according to access rights granted to users, by a simple configuration. A communication system includes: a plurality of forwarding nodes that process a received packet in accordance with a processing rule (packet handling operation) associating a matching rule for identifying a flow and processing content to be applied to a packet that conforms with the matching rule; a policy management apparatus provided with an access control policy storage unit that associates roles assigned to users and access rights set for each role, the policy management apparatus providing information related to access rights associated with a role of a user who is successfully authenticated, to a control apparatus; and the control apparatus that creates a path between a terminal of the user who is successfully authenticated and a resource that the user can access, based on information related to access rights received from the policy management apparatus, and sets a processing rule in a forwarding node in the path in question.

17 Claims, 12 Drawing Sheets

(51) Int. Cl.
*H04L 12/927* (2013.01)
*H04W 12/08* (2009.01)
*H04L 12/24* (2006.01)

(56) References Cited

U.S. PATENT DOCUMENTS

| | | | |
|---|---|---|---|
| 8,626,953 B2* | 1/2014 | Bucholz | 709/249 |
| 2005/0144289 A1* | 6/2005 | Yoshiuchi et al. | 709/227 |
| 2006/0005254 A1* | 1/2006 | Ross | 726/27 |
| 2006/0190721 A1* | 8/2006 | Kawakami et al. | 713/161 |
| 2007/0022474 A1* | 1/2007 | Rowett et al. | 726/11 |
| 2008/0189769 A1* | 8/2008 | Casado et al. | 726/4 |
| 2009/0138577 A1* | 5/2009 | Casado et al. | 709/220 |
| 2009/0307746 A1* | 12/2009 | Di et al. | 726/1 |
| 2011/0289550 A1* | 11/2011 | Nakae | 726/1 |

OTHER PUBLICATIONS

Nick Mckeown, et al., "OpenFlow: Enabling Innovation in Campus Networks", Internet, Mar. 2008, <URL: http://www.openflowswitch.org//documents/openflow-wp-latest.pdf>.

Martin Casado, et al., "Ethane: Taking Control of the Enterprise", Proceedings of the 2007 conference on Applications, technologies, architectures, and protocols for computer communications, Oct. 2007, pp. 1-12, vol. 37, Iss. 4.

International Search Report for PCT/JP2011/079938, dated Jan. 24, 2012.

* cited by examiner

FIG. 3

| USER ID | ROLE ID | ATTRIBUTE |
|---|---|---|
| user1 | role_0001<br>role_0002 | IP:192.168.100.1<br>MAC:00-00-00-44-55-66 |
| user2 | role_0002 | IP:192.168.100.2<br>MAC:00-00-00-77-88-99 |
| .. | .. | .. |

FIG. 4

| ROLE ID | RESOURCE GROUP ID | ACCESS RIGHTS |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| .. | .. | .. |

FIG. 5

| RESOURCE GROUP ID | RESOURCE ID | RESOURCE ATTRIBUTES |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| | resource_000X | IP:YYY.YYY.Y.Y |
| | .. | .. |
| resource_group_0002 | .. | .. |

FIG. 6

| TRANSMISSION SOURCE | DESTINATION | ACCESS RIGHTS | CONDITIONS (OPTIONS) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| .. | .. | .. | .. |

COMMUNICATION SYSTEM, CONTROL APPARATUS, POLICY MANAGEMENT APPARATUS, COMMUNICATION METHOD, AND PROGRAM

CROSS REFERENCE TO RELATED APPLICATIONS

This application is a National Stage of International Application No. PCT/JP2011/079938 filed Dec. 22, 2011, claiming priority based on Japanese Patent Application No. 2010-287908 filed Dec. 24, 2010, the contents of all of which are incorporated herein by reference in their entirety.

TECHNICAL FIELD

The present invention relates to a communication system, a control apparatus, a policy management apparatus, a communication method, and a program, and in particular to a communication system, nodes, a control server, a communication method, and a program, that implement communication by forwarding packets by forwarding nodes disposed in a network.

BACKGROUND

Recently, technology known as OpenFlow has been proposed (see Patent Literature 1 and Non Patent Literatures 1 and 2). In OpenFlow, communication is taken as end-to-end flow, and path control, failure recovery, load balancing, and optimization are performed on a per-flow basis. An OpenFlow switch as specified in Non Patent Literature 2 is provided with a secure channel for communication with an OpenFlow controller positioned as a control apparatus, and operates according to a flow table to which information is added and whose content is rewritten as necessary, according to an instruction from the OpenFlow controller. In the flow table, a set of the following is defined for each flow: matching rule (Header fields) against which a packet header is matched, flow statistical information (Counters), and actions (Actions) that define processing content (see FIG. 12).

For example, when a packet is received, the OpenFlow switch searches the flow table for an entry that has a matching rule (refer to the header fields in FIG. 12) conforming to header information of the received packet. If an entry conforming to the received packet is found as a result of the search, the OpenFlow switch updates the flow statistical information (Counters) and also implements processing content (packet transmission from a specified port, flooding, dropping, and the like) described in the Actions field of the entry in question, for the received packet. On the other hand, if an entry conforming to the received packet is not found as a result of the search, the OpenFlow switch forwards the received packet to the OpenFlow controller via a secure channel, requests determination of a path of the packet based on transmission source and destination of the received packet, receives a flow entry implementing this, and updates the flow table. In this way, the OpenFlow switch uses the entry stored in the flow table as a processing rule (packet handling operation) to perform packet forwarding.

Patent Literature 1

PCT International Publication No. 2008/095010

Non Patent Literature

Non Patent Literature 1

Nick McKeown and seven others, "OpenFlow: Enabling Innovation in Campus Networks", [online], [Searched on Dec. 1, 2010], Internet <URL: http://www.openflowswitch.org//documents/openflow-wp-latest.pdf>

Non Patent Literature 2

"Openflow Switch Specification" Version 1.0.0. (Wire Protocol 0x01) [Searched on Dec. 1, 2010], Internet <URL: http://www.openflowswitch.org/documents/openflow-spec-v1.0.0.pdf>

SUMMARY

The respective disclosures of the Patent Literature and Non Patent Literatures given above are incorporated by reference into this specification. The following analysis is given according to the present invention.

An OpenFlow controller of Patent Literature 1 performs a permission check by making reference to a policy file when a new flow is generated, and thereafter performs access control by calculating a path (see [0052] in Patent Literature 1). As a result, there is a problem in that a configuration of Patent Literature 1 stops at performing access control on a terminal basis, and it is not possible to perform access control on a user basis. For example, in a case where a plurality of users share the same terminal, it may be disadvantageous in that when access to a certain network resource is allowed to one user, another user making use of the same terminal thereafter can access the network resource in question.

A method may be considered in which existing authentication results by a user authentication apparatus or the like are provided to an OpenFlow controller, and access control is performed on a user basis, but with the OpenFlow controller there is a problem in that since it is not grasped what access rights are granted to a user who is successfully authenticated, detailed access control conforming to policies determined on a per-user basis cannot be done. Even in a case where access rights information is held for each user in the OpenFlow controller, there is a problem of resources and load thereof, and a problem of management of access rights for a plurality of users.

It is an object thereof to provide, with regard to a communication system where a control apparatus as in the above-mentioned OpenFlow performs central control of forwarding nodes, the communication system, a control apparatus, a policy management apparatus, a communication method, and a program, that perform detailed access control according to access rights granted to respective users, by a simple configuration.

According to a first aspect, there is provided a communication system including: a plurality of forwarding nodes that process a received packet in accordance with a processing rule (packet handling operation) associating a matching rule for identifying a flow and processing content to be applied to a packet that conforms with the matching rule; a policy management apparatus including an access control policy storage unit that associates roles assigned to users and access rights set for each role, the policy management apparatus providing information related to access rights associated with a role of a user who is successfully authenticated, to a control apparatus; and the control apparatus that creates a path between a terminal of the user who is successfully authenticated and a resource that the user can access, based on information related to access rights received from the policy management apparatus, and sets a processing rule in a forwarding node in the path in question.

According to a second aspect, there is provided a control apparatus, connected to a plurality of forwarding nodes that process a received packet in accordance with a processing rule (packet handling operation) associating a matching rule for identifying a flow and processing content to be applied to a packet that conforms with the matching rule, and a policy management apparatus including an access control policy storage unit that associates roles assigned to users and access rights set for each role, the policy management apparatus providing information related to access rights associated with a role of a user who is successfully authenticated, to the control apparatus; wherein the control apparatus creates a path between a terminal of the user who is successfully authenticated and a resource that the user can access, based on information related to access rights received from the policy management apparatus, and sets a processing rule in a forwarding node in the path in question.

According to a third aspect, there is provided a policy management apparatus that provides information related to access rights corresponding to a role of a user who is successfully authenticated, to the control apparatus described above.

According to a fourth aspect, there is provided a communication method, wherein a control apparatus is connected to a plurality of forwarding nodes that process a received packet in accordance with a processing rule (packet handling operation) associating a matching rule for identifying a flow and processing content to be applied to a packet that conforms with the matching rule, and a policy management apparatus including an access control policy storage unit that associates roles assigned to users and access rights set for each role, the policy management apparatus providing information related to access rights associated with a role of a user who is successfully authenticated, to the control apparatus; the control apparatus performing: creating a path between a terminal of the user who is successfully authenticated and a resource that the user can access, based on information related to access rights received from the policy management apparatus, and setting a processing rule in a forwarding node in the path in question. This method is associated with a particular machine known as a control apparatus that controls the plurality of forwarding nodes that process a received packet.

According to a fifth aspect, there is provided a program that executes the processes as defined below on a computer making up a control apparatus, connected to a plurality of forwarding nodes that process a received packet in accordance with a processing rule (packet handling operation) associating a matching rule for identifying a flow and processing content to be applied to a packet that conforms with the matching rule, and a policy management apparatus including an access control policy storage unit that associates roles assigned to users and access rights set for each role, the policy management apparatus providing information related to access rights associated with a role of a user who is successfully authenticated, to the control apparatus: a process of creating a path between a terminal of the user who is successfully authenticated and a resource that the user can access, based on information related to access rights received from the policy management apparatus, and a process of setting a processing rule in a forwarding node in the path in question.

This program may be recorded on a computer-readable storage medium. That is, the present invention may be embodied as a computer program product.

The meritorious effects of the present invention are summarized as follows. According to the present disclosure, it is possible to perform not only flow based path control, but also detailed access control based on roles granted to respective users.

BRIEF DESCRIPTION OF DRAWINGS

FIG. 3 is an example of authentication information held in an authentication apparatus of the first exemplary embodiment of the invention.

FIG. 4 is an example of policy information stored in an access control policy storage unit of the first exemplary embodiment of the invention.

FIG. 5 is an example of resource information stored in a resource information storage unit of the first exemplary embodiment of the invention.

FIG. 6 is an example of an access control list held in a control apparatus from a policy management apparatus of the first exemplary embodiment of the invention.

PREFERRED MODES

Figure 1:
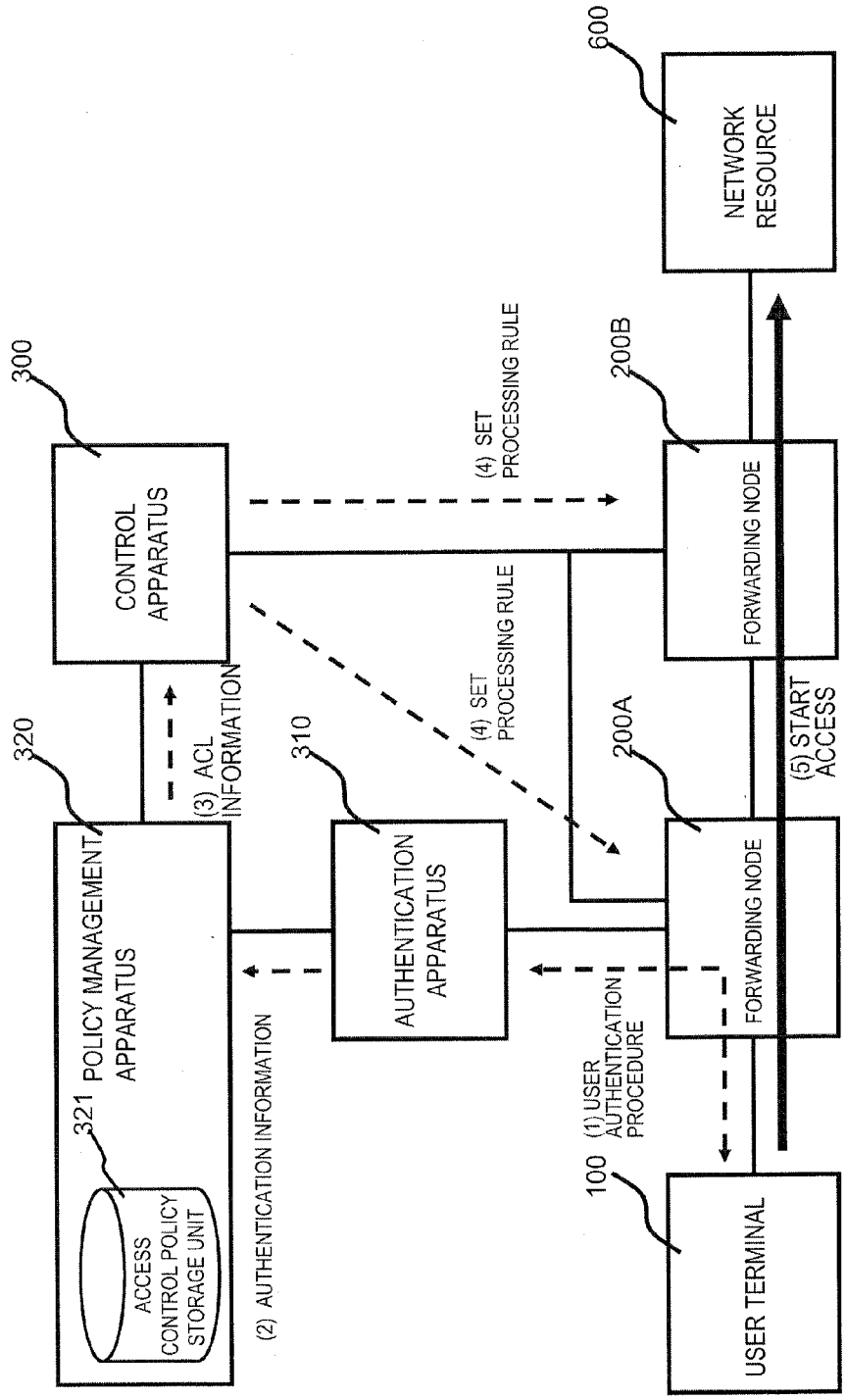
FIG. 1 is a diagram describing an outline of the present invention.

First a description is given concerning an outline of an exemplary embodiment of the present invention, making reference to the drawings. As shown in FIG. 1, the present invention may be implemented in an exemplary embodiment thereof, by a plurality of forwarding nodes 200A and 200B that process received packets in accordance with a processing rule associating a matching rule for identifying a flow and processing content to be applied to a packet that conforms with the matching rule; a policy management apparatus 320, and a control apparatus 300 that sets a processing rule with a period of validity in the forwarding nodes 200A and 200B. It is to be noted that reference symbols in the drawings attached to this summary are added for convenience to respective elements as an example in order to aid understanding and are not intended to limit the invention to modes shown in the drawings.

More specifically, the policy management apparatus 320 is provided with an access control policy storage unit 321 that associates roles assigned to users and access rights set for each role, and the policy management apparatus 320 provides information related to the access rights associated with the role of a user who is successfully authenticated, to the control apparatus, based on an authentication result provided by an authentication apparatus 310 or the like. The control apparatus 300 creates a path between a terminal 100 of the user who is successfully authenticated and a network resource 600 that the user can access, based on the information related to the access rights which is received from the policy management apparatus 320, and sets a processing rule in a forwarding node in the path in question.

In this way it is possible to distinguish the accessible network resource 600 in accordance with a role given to the user, and in addition, to realize access by setting paths for respective flows. It is to be noted that a period of validity is provided for the processing rules, and in a case where the period of validity has elapsed from being set in the forwarding nodes 200A and 200B, or from the last time a packet conforming to a matching rule is received, the processing rule in question may be deleted.

In a case where user authentication fails, in a case where the user has succeeded in authentication but the user has attempted to access a resource exceeding the user's role, it is desirable to make the control apparatus 300 set at a starting point side of the path (the forwarding node 200A in FIG. 1) a processing rule dropping packets attempting access to a resource outside an allowed range thereof. In this way, it is possible to reduce load on the control apparatus 300.

First Exemplary Embodiment

Figure 2:
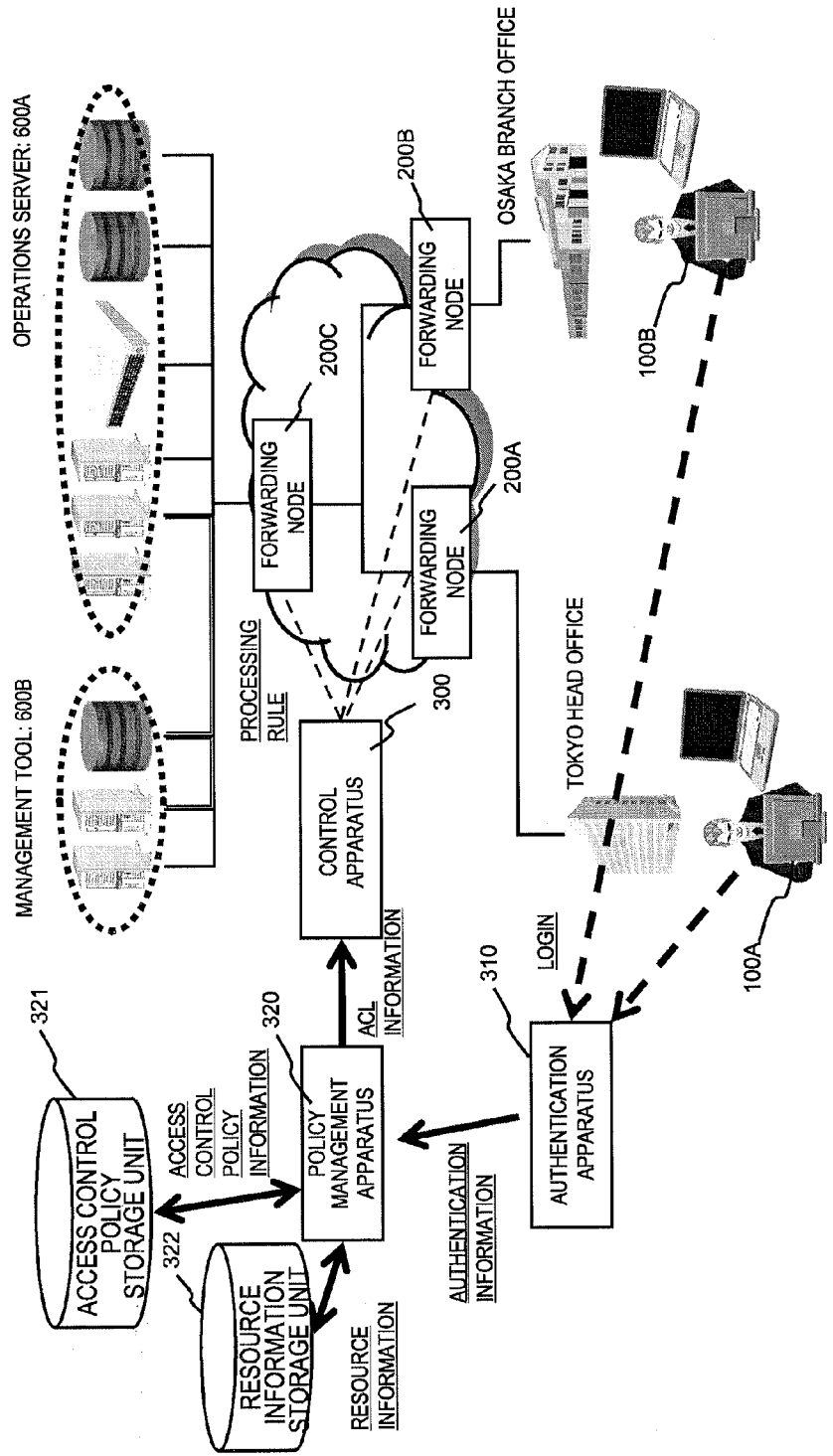
FIG. 2 is a diagram representing a configuration of a communication system of a first exemplary embodiment of the invention.

Next, a detailed description is given concerning a first exemplary embodiment of the present invention, making reference to the drawings. FIG. 2 is a diagram representing a configuration of a communication system of the first exemplary embodiment of the present invention. FIG. 2 shows a plurality of forwarding nodes 200A, 200B and 200C, a control apparatus 300 that sets processing rules with these forwarding nodes, a policy management apparatus 320 that provides access control list information (ACL information) to the control apparatus 300, and an authentication apparatus 310 that provides authentication information indicating an authentication result to the policy management apparatus 320.

Figure 12:
FIG. 12 is a diagram representing a flow entry configuration as described in Non Patent Literature 2.

The forwarding nodes 200A, 200B and 200C are switching devices that process a received packet in accordance with a processing rule associating a matching rule for identifying a flow and processing content to be applied to a packet that conforms with the matching rule. An OpenFlow switch of Non Patent Literature 2 that operates a flow entry shown in FIG. 12 as a processing rule may be used as the forwarding nodes 200A, 200B and 200C. In the present exemplary embodiment, the forwarding node 200A is disposed at Tokyo head office and receives packets to an operations server 600A and/or a management tool 600B, from a user terminal 100A in Tokyo head office. In the same way, the forwarding node 200B is disposed at an Osaka branch office and receives packets to the operations server 600A and/or the management tool 600B, from a user terminal 100B in the Osaka branch office.

The operations server 600A and the management tool 600B are connected to the forwarding node 200C. The operations server 600A is a server that provides service used in daily operations by a user in the Tokyo head office or the Osaka branch office. The management tool 600B provides a management tool for managing setting of the operations server or information held in an access control policy storage unit 321 or a resource information storage unit 322. In the following description, resource_group_0001 is assigned as a resource group ID to the operations server 600A, and resource_group_0002 is assigned as a resource group ID to the management tool 600B.

The authentication apparatus 310 is an authentication server or the like that performs a user authentication procedure with the user terminals 100A and 100B using a password, biometric authentication information, or the like. The authentication apparatus 310 transmits authentication information indicating a result of the user authentication procedure with the user terminals 100A and/or 100B to the policy management apparatus 320.

FIG. 3 is an example of authentication information held in the authentication apparatus 310 of the first exemplary embodiment. For example, in a case where authentication succeeds for a user having a user ID of user1, the authentication apparatus 310 transmits an entry for user1 with attributes: user1, IP address: 192.168.100.1, and MAC address: 00-00-00-44-55-66, and role ID: role_0001, as authentication information to the policy management apparatus 320. Similarly, in a case where authentication succeeds for a user having a user ID of user2, an entry for user2 with attributes: user2, IP address: 192.168.100.2, and MAC address: 00-00-00-77-88-99, and role ID: role_0002, is transmitted as authentication information to the policy management apparatus 320. In a case where user authentication fails, the authentication apparatus 310 may transmit authentication information indicating failure in authentication of a user terminal having the attributes in question to the policy management apparatus 320. In a case where a processing rule to drop a packet for an unknown flow is set in the forwarding nodes 200A to 200C, transmission of authentication information can be omitted when there is a failure.

The policy management apparatus 320 is a device that is connected to the access control policy storage unit 321 and the resource information storage unit 322, and creates access control list information (ACL information) corresponding to authentication information received from the authentication apparatus 310, to be transmitted to the control apparatus 300.

FIG. 4 is an example of policy information stored in the access control policy storage unit 321. The example of FIG. 4 shows policy information in which a resource group ID assigned to a resource group and access rights are set for each role distinguished by a role ID. For example, a user having a role ID: role_0001 is allowed access to both resource groups with IDs: resource_group_0001 and resource_group_0002. On the other hand, a user having a role ID: role_0002 is denied access to resource group ID: resource_group_0001 but is allowed access to resource_group_0002.

FIG. 5 is an example of resource information stored in the resource information storage unit 322. The example of FIG. 5 shows content associating resource IDs and other detailed attributes of resources belonging to the resource group IDs described above. For example, a group identified by the resource group ID: resource_group_0001 includes resources having resource_0001, resource_0002, resource_0003, and IP addresses, MAC address, port number used for a service and the like, of each thereof can be identified.

Making reference to the policy information and resource information described above, the policy management apparatus 320 provides access control list information (ACL information) of a user who has been authenticated by the authentication apparatus 310 to the control apparatus 300. Specifically, with a role ID included in the authentication information received from the authentication apparatus 310, it is possible to identify content of a resource group ID and access rights thereof attached to the role ID in question from the policy information of FIG. 4. Using information of resources belonging to the resource group ID from the resource information of FIG. 5, access control list information (ACL information) is created. In a case of receiving authentication information indicating an authentication failure for a user terminal from the authentication apparatus 310, the policy management apparatus 320 creates access control list information (ACL information) with content denying access to respective resource groups on a starting point side of the path (the forwarding node 200A in FIG. 1), in the control apparatus 300.

FIG. 6 is access control list information (ACL information) of a user having a user ID: user1, created from information shown in FIG. 3, FIG. 4, and FIG. 5. Values of attribute information of user ID: user1 of the authentication information of FIG. 3 are set in a transmission source field of FIG. 6. Resource attributes extracted from the resource information of FIG. 5 based on content of the role ID: role_0001 of policy information of FIG. 4 are set in a destination field. A value the same as access rights of the role ID: role_0001 of policy information of FIG. 4 is set in an access rights field. A service and port number that are set in the resource attribute field of the resource information of FIG. 5 are set in a conditions (options) field.

The control apparatus 300 creates a processing rule implementing the above access control list information (ACL information) and sets the processing rule in the forwarding nodes 200A to 200C.

Figure 7:
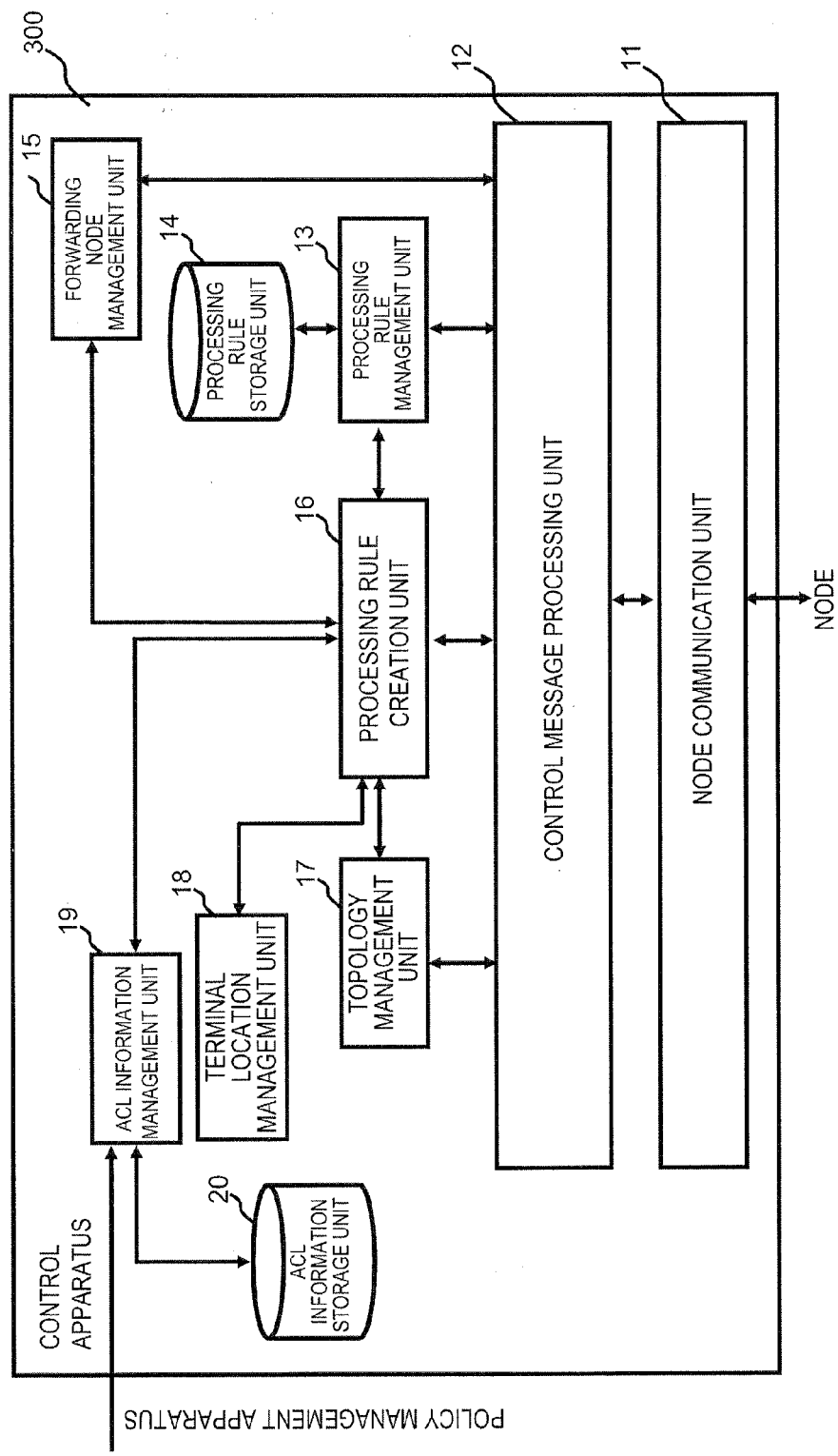
FIG. 7 is a block diagram representing a configuration of a control apparatus of the first exemplary embodiment of the invention.

FIG. 7 is a block diagram representing a detailed configuration of the control apparatus 300 of the present exemplary embodiment. Referring to FIG. 7, the control apparatus 300 is configured to be provided with: a node communication unit 11 that communicates with the forwarding nodes 200A to 200C, a control message processing unit 12, a processing rule management unit 13, a processing rule storage unit 14, a forwarding node management unit 15, a processing rule creation unit 16, a topology management unit 17, a terminal location management unit 18, an ACL information management unit 19, and an ACL information storage unit 20. These operate in the following respective ways.

The control message processing unit 12 analyzes a control message received from a forwarding node and delivers control message information to a relevant processing means inside the control apparatus 300.

The processing rule management unit 13 manages which processing rule is set in which forwarding node. Specifically, a processing rule created by the processing rule creation unit 16 is recorded in the processing rule storage unit 14 and set in a forwarding node, and the recorded information of the processing rule storage unit 14 is updated in response to a case where a change occurs in a processing rule set in a forwarding node, by a processing rule delete notification or the like from the forwarding node.

The forwarding node management unit 15 manages capabilities (for example, type and number of ports, type of action supported, and the like) of the forwarding nodes controlled by the control apparatus 300.

On receiving access control list information (ACL information) from the ACL information management unit 19, the processing rule creation unit 16 creates a path based on content thereof, and creates a processing rule implementing the path. Specifically, the processing rule creation unit 16 calculates a packet forwarding path to a resource for which access rights from a user terminal are held, based on location information of a communication terminal managed by the terminal location management unit 18 and network topology information configured by the topology management unit 17. Next, the processing rule creation unit 16 obtains port information of forwarding nodes in the forwarding path from the forwarding node management unit 15, and obtains an action to be executed in a forwarding node in the path in order to implement the calculated forwarding path, and a matching rule for identifying a flow applying the action in question. It is to be noted that the matching rule may be created using a transmission source IP address, a destination IP address, conditions (options), and the like, of the access control list information (ACL information) of FIG. 6. Accordingly, in a case of the first entry of the access control list information (ACL information) of FIG. 6, respective processing rules are created that determine actions by which a packet from a source IP address of 192.168.100.1 to a destination IP address 192.168.0.1 is forwarded from a port connected to the operations server 600A or management tool 600B, or the forwarding node 200C that is a next hop.

Furthermore, with regard to a resource for which access rights are not held, based on location information of the user terminal managed by the terminal location management unit 18, the processing rule creation unit 16 creates a processing rule determining an action to drop packets to the resource for which access rights are not held from the user terminal in question and a matching rule, in a forwarding node to which the user terminal is connected.

The topology management unit 17 configures network topology information based on connection relations of the forwarding nodes 200A to 200C collected via the node communication unit 11.

The terminal location management unit 18 manages information for identifying the location of the user terminal that is connected to the communication system. In the present exemplary embodiment, a description is given using an IP address as information for distinguishing the user terminal, and a forwarding node identifier of a forwarding node to which the user terminal is connected and port information thereof, as information for identifying the location of the user terminal. Clearly, instead of these information items, a terminal and its location may be identified using, for example, information from the authentication apparatus 310.

On receiving access control list information (ACL information) from the policy management apparatus 320, the ACL information management unit 19 stores the information in the ACL information storage unit 20 and also transmits the information to the processing rule creation unit 16.

The above control apparatus 300 may be implemented also by adding a function of creating a processing rule (flow entry) on the occasion of receiving the abovementioned access control list information (ACL information), based on an Open-Flow controller of Non Patent Literature 1 or 2.

The respective units (processing means) of the control apparatus 300 shown in FIG. 3 can also be implemented by a computer program that stores the respective information items described above and executes the respective processes described above on a computer configuring (i.e. making up) the control apparatus 300, using hardware thereof.

Figure 8:
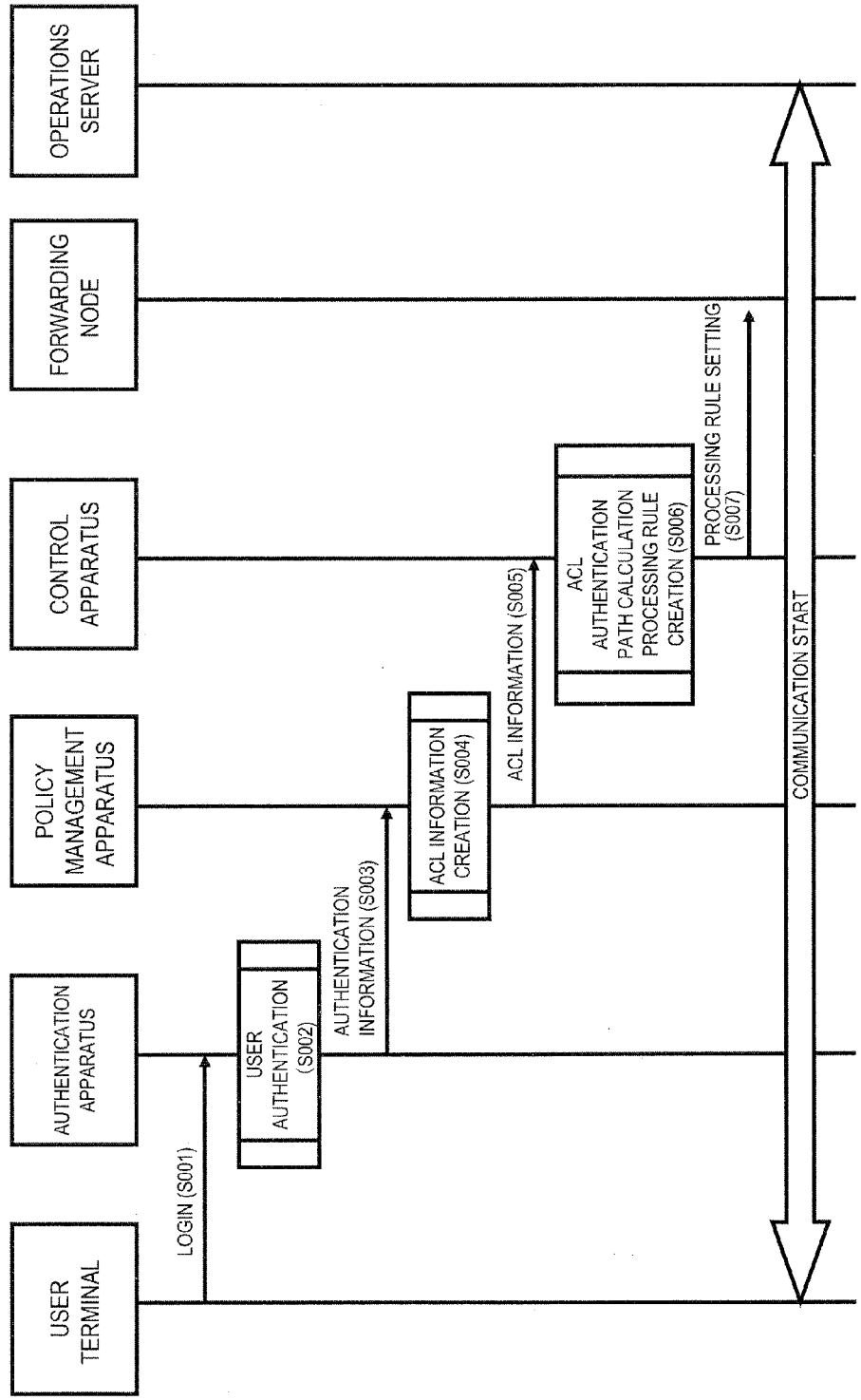
FIG. 8 is a sequence diagram representing a sequence of operations of the first exemplary embodiment of the present invention.

Next, a detailed description is given concerning operation of the present exemplary embodiment, making reference to the drawings. FIG. 8 is a sequence diagram representing a sequence of operations of the present exemplary embodiment. Reference is made to FIG. 8 first. When a user terminal makes a login request to the authentication apparatus 310 (S001 in FIG. 8), the authentication apparatus 310 performs user authentication (S002 in FIG. 8).

When the authentication apparatus 310 transmits authentication information to the policy management apparatus 320

(S003 in FIG. 8), the policy management apparatus refers to the access control policy storage unit 321 and the resource information storage unit 322 based on received authentication information, and creates access control list information (ACL information) (S004 in FIG. 8), to be transmitted to the control apparatus 300 (S005 in FIG. 8).

The control apparatus 300 confirms the access control list information (ACL information), performs path calculation for implementing content thereof, and creates a processing rule for determining packet processing content in each forwarding node (S006 in FIG. 8).

When the control apparatus 300 sets a processing rule in a forwarding node in a path (S007 in FIG. 8), communication between a user terminal and the operations server becomes possible ("communication start" in FIG. 8).

Figure 9:
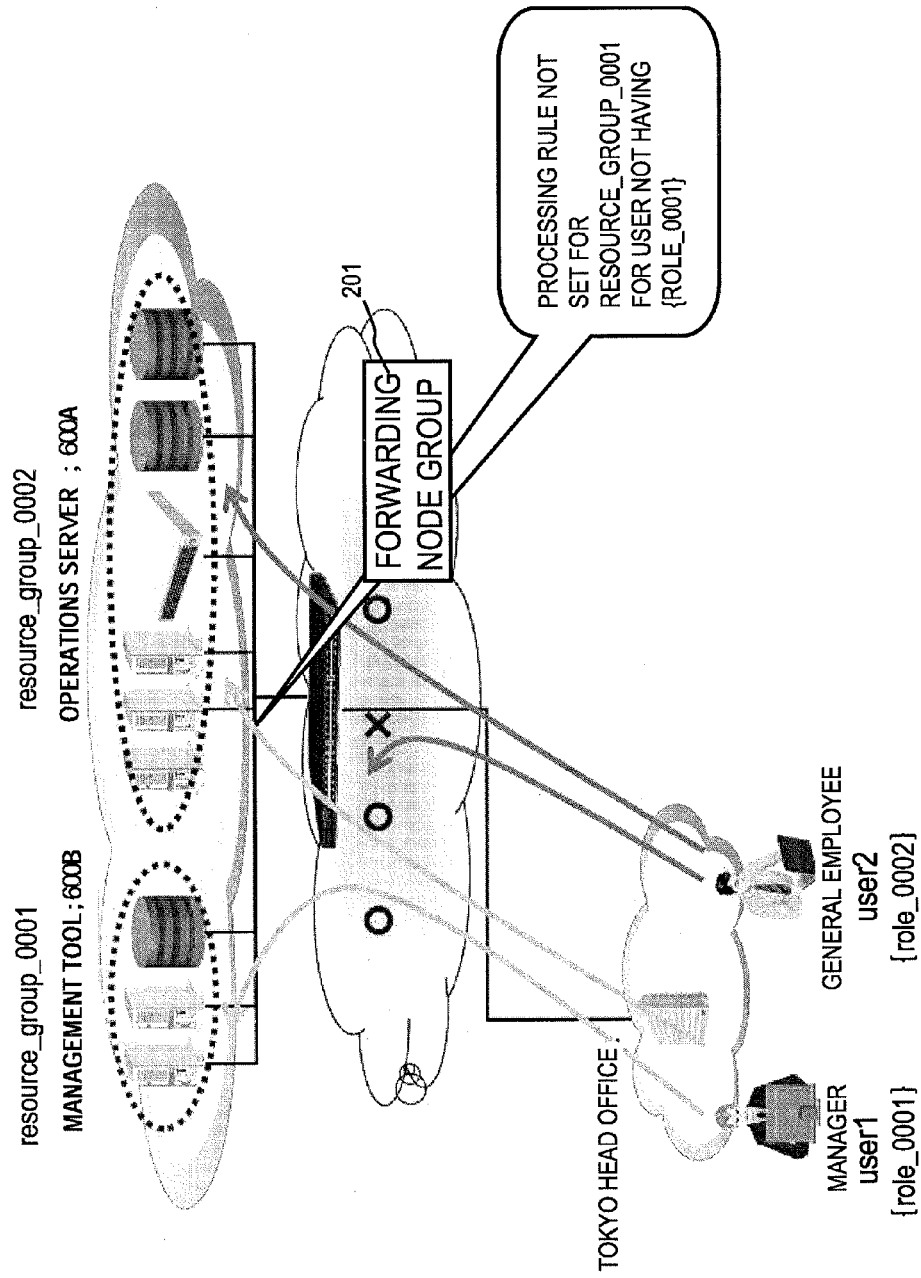
FIG. 9 is a diagram for describing an example of access control according to a configuration of the first exemplary embodiment of the present invention.

As described above, by providing the access control list information (ACL information) created based on policy information to the control apparatus 300, and creating a processing rule based thereon, as shown in FIG. 9, for example, for a manager and a general employee it is possible to perform accurate access control by only managing 2 role IDs, role ID: role_0001 and role ID: role_0002.

Figure 10:
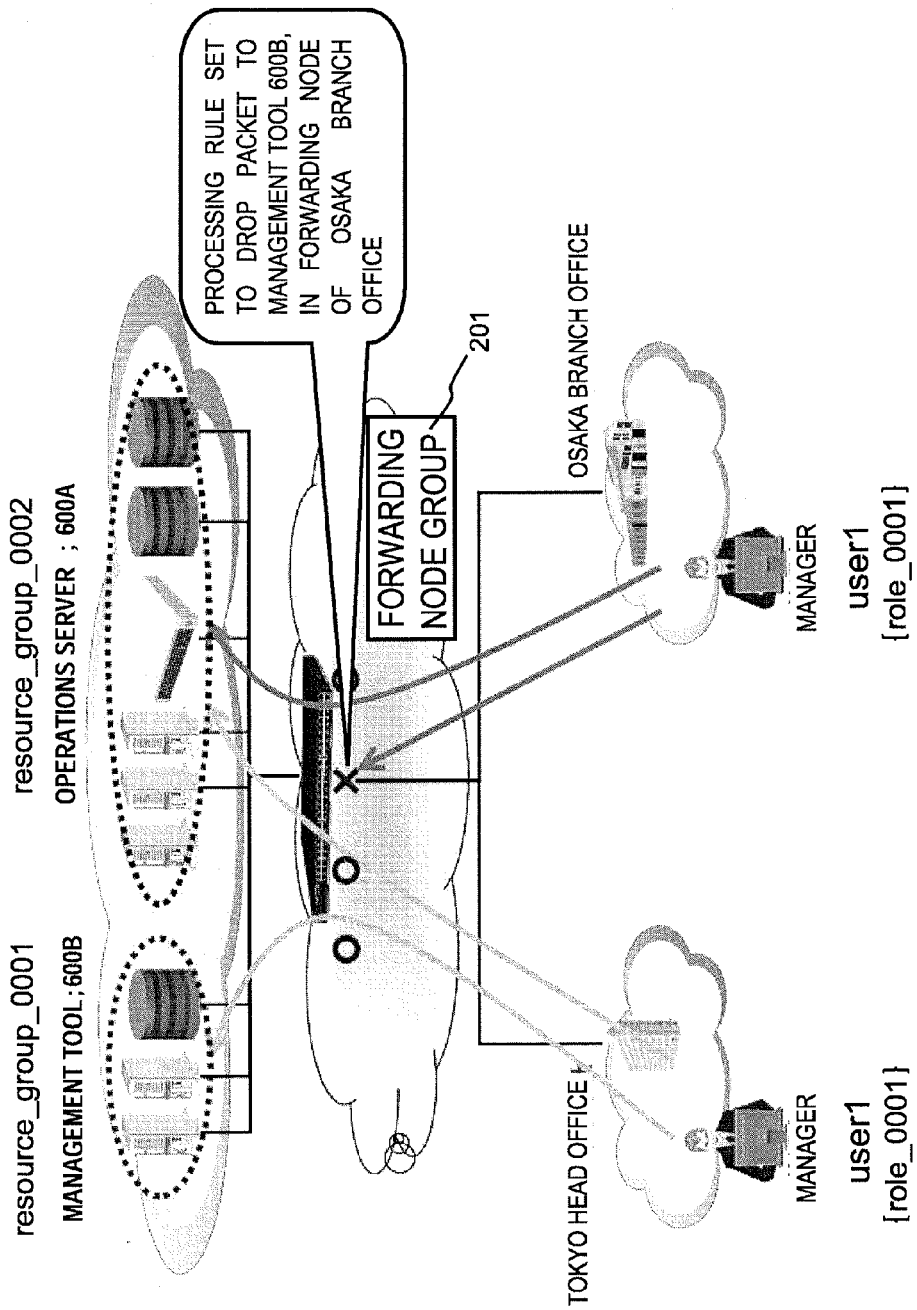
FIG. 10 is a diagram for describing another example of access control according to a configuration of the first exemplary embodiment of the present invention.

By adding a location information field allowing access, to policy information shown in FIG. 4, in a case where a manager having a role ID: role_0001 performs access from the Tokyo head office, as shown in FIG. 10, access to both the operations server and the management tool is allowed, but in a case of performing access from the Osaka branch office on a business trip or the like, it is possible to implement access restriction in accordance with location, such as restricting access to the management tool or the like. Clearly, it is also possible to entirely deny access from the Osaka branch office, and in this regard, it is possible to perform a change simply by only rewriting an entry of a role ID relevant to the policy information, via the management tool 600B.

By adding a location information field, or a period information or time information field, for allowing access, to the policy information shown in FIG. 4, it is also possible to perform setting of a processing rule giving consideration to location, or period or time, to the control apparatus 300. For example, as shown in FIG. 10, by setting a processing rule to drop packets to the management tool 600B, in the forwarding node 200B of the Osaka branch office, in a case where a manager having a role ID: role_0001 performs access from the Tokyo head office, access to both the operations server and the management tool is allowed, but in a case of performing access from the Osaka branch office on a business trip or the like, it is possible to implement access restriction in accordance with location, such as restricting access to the management tool or the like. Clearly, it is also possible to entirely deny access from the Osaka branch office, and in this regard, it is possible to perform a change simply by only rewriting an entry of a role ID relevant to the policy information, via the management tool 600B.

Figure 11:
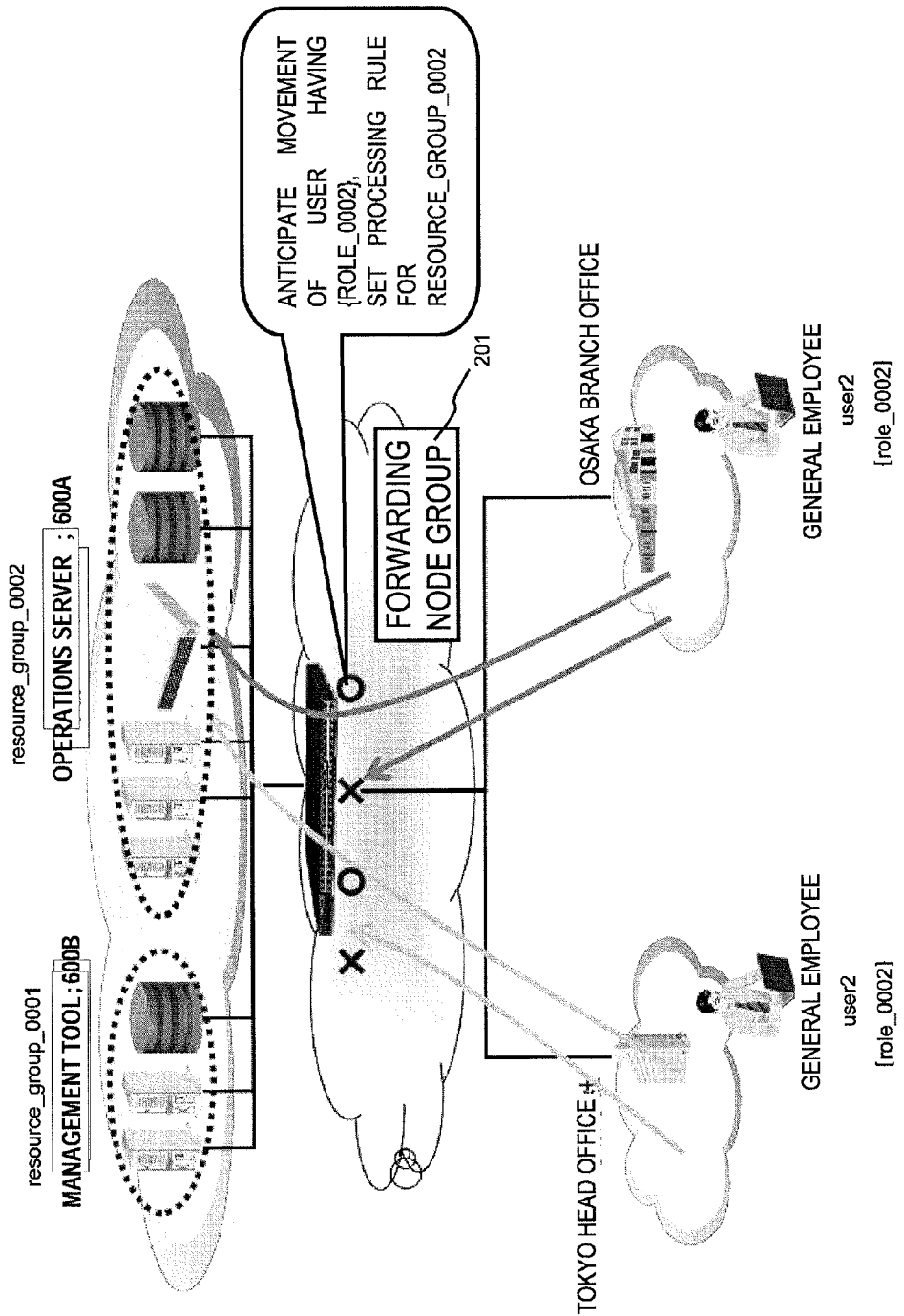
FIG. 11 is a diagram for describing another example of access control according to a configuration of the first exemplary embodiment of the present invention.

Furthermore, as shown in FIG. 11 for example, by setting a processing rule allowing access to the operations server 600A from a user terminal of a general employee, in a forwarding node in a path having the forwarding node 200B of the Osaka branch office as a starting point, it is possible to allow access from the Osaka branch office by the general employee who has a role ID: role_0002, on a business trip or the like. With this control also, it is possible to perform a change simply by only rewriting an entry of a role ID relevant to the policy information, via the management tool 600B.

In the same way, by the control apparatus 300 updating a processing rule by making reference to policy information at a prescribed time interval, for a certain period (for example, 2011, Apr. 1 to 2011, Jun. 1) or a certain time slot (for example, 10:00 to 17:30), for each role, it is possible to allow access to the management tool 600B, and for other periods and times, it is possible to apply an access restriction to restrict access to the management tool 600B. It is also possible to implement an access restriction combining the abovementioned location, time, and period.

Descriptions have been given above of respective exemplary embodiments of the present invention, but the present invention is not limited to the abovementioned exemplary embodiments, and further modifications, substitutions, and adjustments can be added within a scope that does not depart from a fundamental technological concept of the invention. For example, in the abovementioned respective exemplary embodiments, a description was given in which the control apparatus 300, the authentication apparatus 310, the policy management apparatus 320, the access control policy storage unit 321, and the resource information storage unit 322 are each independently provided, but it is also possible to use a configuration in which these are integrated as appropriate.

In the abovementioned exemplary embodiments, a description was given in which the control apparatus 300 sets a processing rule to implement content determined in the access control list information (ACL information), on the occasion of receiving the access control list information (ACL information), but it is also possible for the control apparatus 300 to create and set a processing rule at the occasion of a flow being generated and a request being received to set a processing rule from a forwarding node that has received a first packet. In this way, it is possible to curtail the number of processing rules set in each of the forwarding nodes.

In the abovementioned exemplary embodiments a description was given in which the user terminals 100A and 100B perform a direct authentication procedure in the authentication apparatus 310, but it is possible to use a configuration forwarding packets for authentication related to the authentication procedure to the authentication apparatus via forwarding nodes, and implement an authentication procedure. For example, implementation is also possible by setting a processing rule determining an action for forwarding a matching rule identifying a packet for authentication and the packet in question to the authentication apparatus 310, in a forwarding node connected to the user terminals 100A and 100B. In the same way, it is also possible to exchange information given and received between the authentication apparatus 310, the policy management apparatus 320 and the control apparatus 300, by setting a path between forwarding nodes and setting a processing rule for forwarding these.

Finally, preferred modes of the present invention are summarized.

<First Mode>

As in the communication system described in the first aspect.

<Second Mode>

The control apparatus preferably holds information related to access rights received from the policy management apparatus, and creates the path on an occasion of receiving a request to set the processing rule from the forwarding node related to a packet received from the user terminal, and performs setting of a processing rule.

<Third Mode>

The control apparatus preferably sets a processing rule to drop a packet to a resource for which access from the user terminal is denied, in the forwarding node, based on information related to access rights received from the policy management apparatus.

<Fourth Mode>

The information related to access rights preferably includes access rights that depend on location of the user terminal, and the control apparatus preferably sets the processing rule based on location of the user terminal identified from information included in a request to set a processing rule received from the forwarding node, and access rights that depend on location of the user terminal.

<Fifth Mode>

As in the control apparatus described in the second aspect.

<Sixth Mode>

The control apparatus preferably holds information related to access rights received from the policy management apparatus, and preferably creates the path on an occasion of receiving a request to set the processing rule from the forwarding node related to a packet received from the user terminal, and performs setting of a processing rule.

<Seventh Mode>

The control apparatus preferably sets a processing rule to drop a packet to a resource for which access from the user terminal is denied, in the forwarding node, based on information related to access rights received from the policy management apparatus.

<Eighth Mode>

Information related to access rights received from the policy management apparatus preferably includes access rights that depend on location of the user terminal, and the control apparatus preferably sets the processing rule based on location of the user terminal identified from information included in a request to set a processing rule received from the forwarding node, and access rights that depend on location of the user terminal.

<Ninth Mode>

As in the policy management apparatus described in the third aspect.

<Tenth Mode>

As in the communication method described in the fourth aspect.

<Eleventh Mode>

As in the program described in the fifth aspect.

It is to be noted that component elements and steps in the communication method and program, respectively, similar to the communication system of the First Mode, may be expanded in the same way as the Second to Fourth Modes.

It is to be noted that the various disclosures of the above-mentioned Patent Literature and the Non Patent Literatures are incorporated herein by reference thereto. Modifications and adjustments of exemplary embodiments may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments, respective elements of the respective drawings, and the like) are possible within the scope of the claims of the present invention. That is, the present invention clearly includes every type of transformation and modification that a person skilled in the art can realize according to the entire disclosure including the scope of the claims of the present invention and to technological concepts thereof.

REFERENCE SIGNS LIST 11 node communication unit
12 control message processing unit
13 processing rule management unit
14 processing rule storage unit
15 forwarding node management unit
16 processing rule creation unit
17 topology management unit
18 terminal location management unit
19 ACL information management unit
20 ACL information storage unit
100A, 100B user terminal
200A to 200C forwarding nodes
300 control apparatus
310 authentication apparatus
320 policy management apparatus
321 access control policy storage unit
322 resource information storage unit
600 network resource
600A operations server
600B management tool

The invention claimed is:

1. A communication system, comprising:
a plurality of forwarding nodes configured to process a received packet in accordance with a packet handling operation associating a matching rule for identifying a flow and processing content to be applied to a packet that conforms with the matching rule;
a policy management apparatus comprising an access control policy storage unit configured to associate roles assigned to users and access rights set for each role; and
a control apparatus,
wherein the policy management apparatus is further configured to provide information related to access rights associated with a role of a user who is successfully authenticated to the control apparatus,
wherein the control apparatus is configured to create a path between a terminal of the user who is successfully authenticated and a resource that the user can access, based on information related to access rights received from the policy management apparatus, to set a packet handling operation in a forwarding node in the path, and to set a period of validity for the packet handling operation of the forwarding node in the path.

2. The communication system according to claim 1, wherein
the control apparatus is further configured to:
hold information related to access rights received from the policy management apparatus, and
create the path on an occasion of receiving a request to set the packet handling operation from the forwarding node related to a packet received from the user terminal, and
perform a setting of the packet handling operation.

3. The communication system according to claim 1, wherein
the control apparatus is further configured to set the packet handling operation to drop a packet to a resource for which access from the user terminal is denied, in the forwarding node, based on information related to access rights received from the policy management apparatus.

4. The communication system according claim 1, wherein
information related to access rights comprises access rights that depend on a location of the user terminal, and
the control apparatus is further configured to set the packet handling operation based on the location of the user terminal identified from information included in a request to set the packet handling operation received from the forwarding node, and access rights that depend on the location of the user terminal.

5. A control apparatus,
the control apparatus being connected to a plurality of forwarding nodes configured to process a received packet in accordance with a packet handling operation associating a matching rule for identifying a flow and processing content to be applied to a packet that conforms with the matching rule, and a policy management apparatus comprising an access control policy storage unit configured to associate roles assigned to users and access rights set for each role,
wherein the policy management apparatus is further configured to provide information related to access rights associated with a role of a user who is successfully authenticated, to the control apparatus, and;
wherein the control apparatus is configured to create a path between a terminal of the user who is successfully authenticated and a resource that the user can access, based on information related to access rights received from the policy management apparatus, to set a packet handling operation in a forwarding node in the path, and to set a period of validity for the packet handling operation of the forwarding node in the path.

6. The control apparatus according to claim 5, wherein the control apparatus is further configured to:
hold information related to access rights received from the policy management apparatus,
create the path on an occasion of receiving a request to set the packet handling operation from the forwarding node related to a packet received from the user terminal, and perform a setting of the packet handling operation.

7. The control apparatus according to claim 5, wherein the control apparatus is further configured to set the packet handling operation to drop a packet to a resource for which access from the user terminal is denied, in the forwarding node, based on information related to access rights received from the policy management apparatus.

8. The control apparatus according claim 5, wherein
information related to access rights received from the policy management apparatus comprises access rights that depend on a location of the user terminal, and
the control apparatus is further configured to set the packet handling operation is set based on the location of the user terminal identified from information included in a request to set the packet handling operation received from the forwarding node, and access rights that depend on the location of the user terminal.

9. A policy management apparatus, configured to provide information related to access rights corresponding to a role of a user who is successfully authenticated, to the control apparatus according to claim 5.

10. A communication method, comprising
using a control apparatus connected to a plurality of forwarding nodes configured to process a received packet in accordance with a packet handling operation associating a matching rule for identifying a flow and processing content to be applied to a packet that conforms with the matching rule, and a policy management apparatus comprising an access control policy storage unit configured to associate roles assigned to users and access rights set for each role, the policy management apparatus providing information related to access rights associated with a role of a user who is successfully authenticated, to the control apparatus;
the control apparatus performing:
creating a path between a terminal of the user who is successfully authenticated and a resource that the user can access, based on information related to access rights received from the policy management apparatus,
setting a packet handling operation in a forwarding node in the path, and
setting a period of validity for the packet handling operation of the forwarding node in the path.

11. A program stored in a non-transitory computer readable medium, configured to control processes as defined below
wherein execution is preformed on a computer making up a control apparatus connected to a plurality of forwarding nodes configured to process a received packet in accordance with a packet handling operation associating a matching rule for identifying a flow and processing content to be applied to a packet that conforms with the matching rule, and a policy management apparatus comprising an access control policy storage unit configured to associate roles assigned to users and access rights set for each role, the policy management apparatus being further configured to provide information related to access rights associated with a role of a user who is successfully authenticated, to the control apparatus;
a process of creating a path between a terminal of the user who is successfully authenticated and a resource that the user can access, based on information related to access rights received from the policy management apparatus,
a process of setting a packet handling operation in a forwarding node in the path, and
a process of setting a period of validity for the packet handling operation of the forwarding node in the path.

12. The communication system according to claim 2, wherein the control apparatus is further configured to set the packet handling operation to drop a packet to a resource for which access from the user terminal is denied, in the forwarding node, based on information related to access rights received from the policy management apparatus.

13. The communication system according to claim 2, wherein
information related to access rights comprises access rights that depend on a location of the user terminal, and
the control apparatus is further configured to set the packet handling operation based on the location of the user terminal identified from information included in a request to set the packet handling operation received from the forwarding node, and access rights that depend on the location of the user terminal.

14. The communication system according to claim 3, wherein
information related to access rights comprises access rights that depend on a location of the user terminal, and
the control apparatus is further configured to set the packet handling operation based on the location of the user terminal identified from information included in a request to set the packet handling operation received from the forwarding node, and access rights that depend on the location of the user terminal.

15. The control apparatus according to claim 6, wherein the control apparatus is further configured to set the packet handling operation to drop a packet to a resource for which access from the user terminal is denied, in the forwarding node, based on information related to access rights received from the policy management apparatus.

16. The control apparatus according to claim 6, wherein
information related to access rights received from the policy management apparatus comprises access rights that depend on a location of the user terminal, and the control apparatus is further configured to set the packet handling operation based on the location of the user terminal identified from information included in a request to set the packet handling operation received from the forwarding node, and access rights that depend on the location of the user terminal.

17. The control apparatus according to claim 7, wherein information related to access rights received from the policy management apparatus comprises access rights that depend on a location of the user terminal, and
the control apparatus is further configured to set the packet handling operation based on the location of the user terminal identified from information included in a request to set the packet handling operation received from the forwarding node, and access rights that depend on the location of the user terminal.

* * * * *